(12) United States Patent
Nguyen et al.

(10) Patent No.: US 10,041,618 B2
(45) Date of Patent: Aug. 7, 2018

(54) CONNECTION ASSEMBLY

(75) Inventors: Hy Nguyen, Gothenburg (SE); Kent Häll, Drammen (NO); Øystein Waerstad, Oslo (NO)

(73) Assignee: Aker Solutions AS, Lysaker (NO)

( * ) Notice: Subject to any disclaimer, the term of this patent is extended or adjusted under 35 U.S.C. 154(b) by 1227 days.

(21) Appl. No.: 14/110,850

(22) PCT Filed: Mar. 26, 2012

(86) PCT No.: PCT/EP2012/001309
§ 371 (c)(1),
(2), (4) Date: Oct. 9, 2013

(87) PCT Pub. No.: WO2012/156004
PCT Pub. Date: Nov. 22, 2012

(65) Prior Publication Data
US 2014/0035281 A1    Feb. 6, 2014
US 2014/0232109 A2    Aug. 21, 2014

(30) Foreign Application Priority Data

May 18, 2011    (NO) .................................. 20110730

(51) Int. Cl.
*F16L 37/127*    (2006.01)
*E21B 17/043*    (2006.01)
(Continued)

(52) U.S. Cl.
CPC .......... *F16L 37/127* (2013.01); *E21B 17/043* (2013.01); *E21B 17/085* (2013.01);
(Continued)

(58) Field of Classification Search
CPC .... E21B 17/043; E21B 17/085; F16B 7/0426; F16B 7/182; F16L 37/0915;
(Continued)

(56) References Cited

U.S. PATENT DOCUMENTS 4,516,795 A    5/1985    Baugh
4,557,508 A    12/1985   Walker
(Continued)

FOREIGN PATENT DOCUMENTS

| | | |
|---|---|---|
| EP | 367419 A1 | 5/1990 |
| GB | 2129894 A | 5/1984 |
| WO | WO-2004/018825 A2 | 3/2004 |

OTHER PUBLICATIONS

Kepka, Maciek, International Search Report prepared for PCT/EP2012/001309, dated Jul. 1, 2013, 5 pages.

*Primary Examiner* — Josh Skroupa
(74) *Attorney, Agent, or Firm* — Winstead PC

(57) ABSTRACT

Connection assembly (1) for connecting a first and second pipe end (201, 301) of pipes (200, 300). The pipe ends exhibit outwardly facing pipe locking profiles (203, 303). Locking segments (101) are distributed about the second pipe end (301) and have a connected (103) and a movable portion (105) with segment locking profiles (103a, 105a). The movable portion (105) is pivotable between an inward locking position and an outward free position. Among the pairs of facing locking profiles, comprising a first pair including the segment locking profile (103a) and facing pipe locking profile (303) of the second pipe end, and a second pair, at least one pair exhibits an inclined face (S1, S2, S3) which is misaligned a misalignment distance (M1, M2, M3) with respect to the facing inclined face (P1, P2, P3) of the profile with which it engages.

17 Claims, 6 Drawing Sheets

(51) Int. Cl.
  *E21B 17/08*         (2006.01)
  *F16L 37/138*        (2006.01)
(52) U.S. Cl.
  CPC ....... *F16L 37/138* (2013.01); *Y10T 29/49826* (2015.01); *Y10T 403/5766* (2015.01)
(58) Field of Classification Search
  CPC ..... F16L 37/103; F16L 37/127; F16L 37/138; Y10T 403/25; Y10T 403/3986; Y10T 403/56; Y10T 403/5766; Y10T 403/589
  USPC ....... 403/34, 200, 299, 310, 320; 285/34, 35
  See application file for complete search history.

(56) References Cited

U.S. PATENT DOCUMENTS

| | | | | |
|---|---|---|---|---|
| 4,693,497 A * | 9/1987 | Pettus | .................... | E21B 33/038 285/12 |
| 4,708,376 A * | 11/1987 | Jennings | ............... | E21B 33/038 285/18 |
| 4,775,563 A | 10/1988 | Kaempen | | |
| 4,902,045 A * | 2/1990 | McGugan | ............. | E21B 33/038 279/133 |
| 5,634,671 A | 6/1997 | Watkins | | |
| 6,035,938 A * | 3/2000 | Watkins | ................ | E21B 33/038 166/345 |
| 7,503,391 B2 * | 3/2009 | McCanna | ............. | E21B 33/038 166/343 |
| 2007/0277983 A1 * | 12/2007 | Spiering | ............... | E21B 33/038 166/338 |

\* cited by examiner

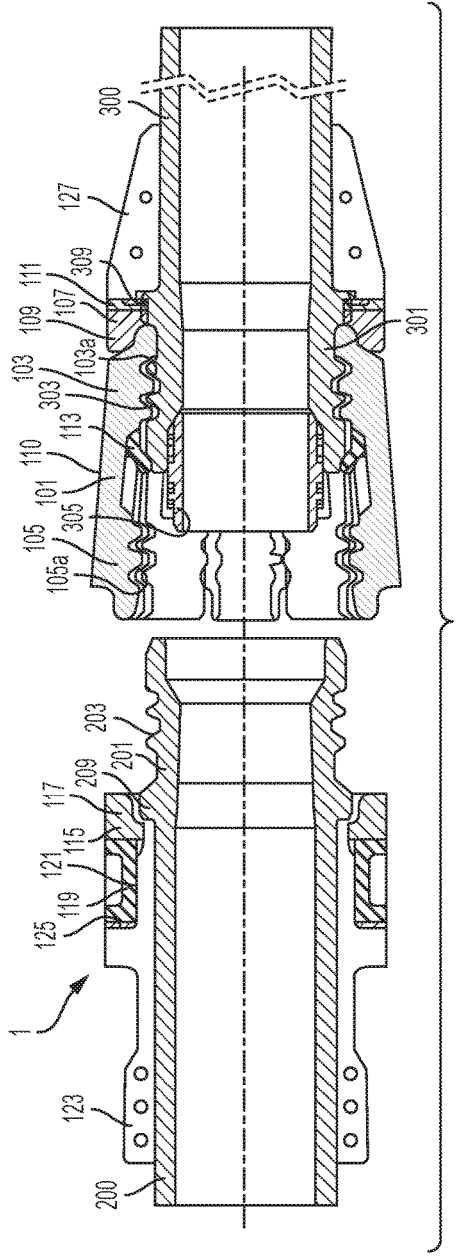
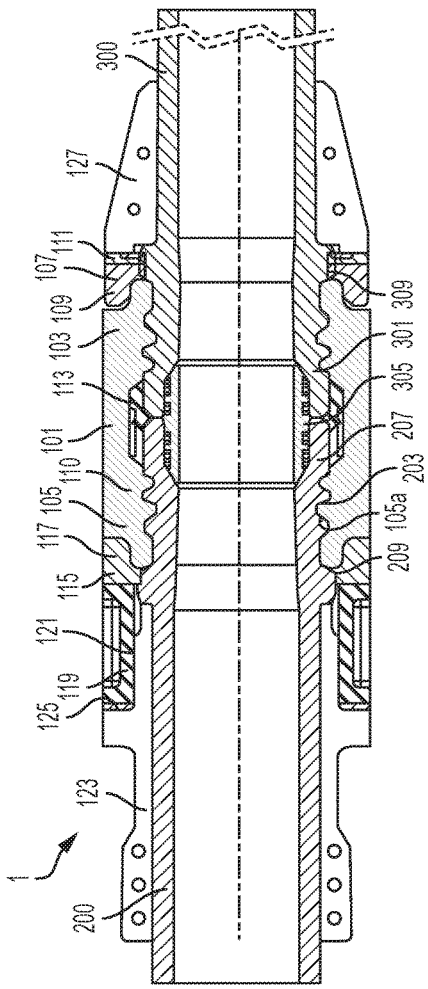
FIG. 1
FIG. 2

CONNECTION ASSEMBLY

The present invention relates to a connection assembly suitable for connection of pipe ends. In particular it concerns a connection assembly with locking segments adapted for being arranged in a pre-tensioned state when in the locking position.

BACKGROUND

There is known a plurality of various solutions for coaxial connection two pipe ends. In particular there exist many solutions for connection of riser segments into riser strings suited to extend through the sea down to a subsea well. Such strings of riser segments need to withstand large and varying forces, and the connections need to preserve a sealed connection between each riser segment.

In some types of connections a plurality of locking segments is arranged about the two facing pipe ends. The locking segments have inwardly facing locking profiles which engage with outwardly facing locking profiles of the respective pipe ends. In order to better withstand the large and varying forces, the locking segments are provided with a preload when in the locking position.

European patent application publication EP367419 describes such a connection. A plurality of locking segments are forced into locking engagement with the two facing pipe ends by two externally arranged locking rings. By forcing the two locking rings axially towards each other, the locking segments are forced radially inwards into the locking position. The two locking rings can be moved in the axial direction by actuation of nuts threaded onto bolts that extend through the two locking rings.

Patent publication U.S. Pat. No. 4,557,508 describes a similar solution where one actuation ring with an inclined inner face forces the locking segments inwards into locking position when being moved in an axial direction.

Patent publication U.S. Pat. No. 5,634,671 describes a riser connector having a split lock ring with inner profiles which are adapted to engage with facing outer locking profiles on both ends of two adjacent riser pipe ends. The profiles exhibit inclined sliding faces which provide a preload in the lock ring when the latter is forced radially into the locking profiles of the pipe ends. The split lock ring extends axially between the two pipe ends and connects them together when in the locking position. When in the locking position, a set of actuating cam rings remains in contact with the lock ring in order to retain the ring in this position.

It is an object of the present invention to provide a connection assembly suitable for connection of facing and coaxially arranged pipe ends, wherein the connection assembly exhibits a lean radial extension and facilitates a quick connection process. Other advantageous objects being complied with will appear from the general description and the detailed embodiment description below.

THE INVENTION

According to a first aspect of the present invention, there is provided a connection assembly adapted to connect a first and a second pipe end of respective first and second pipes in a position where the pipe ends are coaxially arranged and abutting each other. The pipe ends exhibit radially outwardly facing pipe locking profiles and the connection assembly comprises:

a plurality of locking segments which are distributed about the perimeter of the second pipe end and which have a connected portion and a movable portion. The connected portion and the movable portion each have segment locking profiles facing the pipe locking profiles. Furthermore, the movable portion is radially pivotable between an inwardly pivoted locking position and an outwardly pivoted free position, about a pivot section;

a retainer sleeve that extends about the circumference of the second pipe and has an axially protruding retainer shoulder under which a part of the connected portion of the locking segments are arranged and under which the pivot section is located; and a securing sleeve extending about the circumference of the first pipe and having an axially protruding securing shoulder under which a part of the movable portion of the locking segments are arranged when the locking segments are in the locking position.

According to the present invention, among the pairs of facing locking profiles, comprising a first pair including the segment locking profile of the connected portion and facing pipe locking profile of the second pipe end; and a second pair including the segment locking profile of the movable portion and the facing pipe locking profile of the first pipe end;

at least one pair exhibits an inclined face which is misaligned a misalignment distance with respect to the facing inclined face of the profile with which it engages. The misalignment distance brings about tensile stress in the axial direction in the locking segments when they are in the locking position.

Pipe ends as used in this description shall mean not only the end of pipes as such, but also refers to other tubular elements having a circle shaped end being connected to another tubular element having a circle shaped end.

In one embodiment, the segment locking profiles of the connected portion and the movable portion, as well as the pipe locking profiles of the first and second pipe ends all exhibit inclined locking faces. An inclined locking face is a locking profile face adapted to slide along a part of a facing locking profile with which it engages. This sliding results in a pull in the locking segments in the axial direction. In this way the locking segments are provided with a pretension when forced into the locking position.

According to another embodiment, the assembly further comprises a spreading member having a portion of elastic material arranged between the locking segments and the second pipe end, or between adjacent locking segments. The spreading member pushes the locking segments towards the outwardly pivoted free position. In one embodiment the spreading member comprises separate members connected to each locking segment, thus biasing each locking segment separately. The spreading member can also be in the form of a ring that encircles the first pipe end, between the locking segments and the pipe end. A further possibility is arrangement of elastic elements in between the locking segments. Such elements would exert force onto the locking segments in a tangential direction (with respect to the pipes), thereby making them pivot out into the non-connected position. Having the locking segments outwardly biased by a spreading member facilitates the locking process, as the first pipe end easily can be coaxially arranged and moved into abutment with the second pipe end, without colliding with the locking segments connected to the second pipe end.

According to yet an embodiment of the present invention, among the above-mentioned first and second pairs of facing locking profiles, at least one pair exhibits first and second inclined faces of each facing locking profile. In this embodiment the first inclined faces are closer to the opposite pair than the second inclined faces. Furthermore, a first misalignment distance between the first inclined faces is smaller than a second misalignment distance between the second inclined faces. Having a difference in the misalignment distance contributes to a more even distribution of tensile forces within the locking segments and the pipe end of the pipe locking profile in question.

The securing sleeve can be axially retractable on the first pipe, and an elastic collar can be arranged axially between the securing sleeve and a support structure. The elastic collar will then bias the securing sleeve towards the locking segment and prevent unintended release of the connection assembly.

The retainer sleeve can also be axially retractable on the second pipe, and an elastic collar can be arranged axially between the retainer sleeve and a support structure.

One of or both the securing sleeve and the retainer sleeve may be connected to and moved axially on the respective pipe end by means of threads. Alternatively, they may be arranged on a sliding surface of the pipe end and be retained in the correct axial position by adjacent components.

In one embodiment the pipe ends are identical. In this context, identical pipe ends means pipe ends are identical without any attached elements, such as the retainer sleeve. Having the pipe ends identical makes it unnecessary to keep track of the correct end of the pipes when assembling the connection assembly onto the pipe ends.

The segment locking profiles of the connected portion and the segment locking profiles of the movable portion of the locking segments can be identical. In some embodiments, for instance where the spreading member is a spread ring attached to the first pipe end, it will then not matter which end of the locking segment is connected to the first and second pipe ends.

With a connection assembly according to the present invention, the first and second pipe ends can be upset or even upset and weld-less.

In one embodiment, along the axial distance of the segment locking profiles, as well as in between the locking profiles, the locking segments constitute the outermost face of the locking assembly, when in the locking position.

Alternatively, along the axial distance in between the locking profiles, the locking segments constitute the outermost face of the locking assembly, when in the locking position.

The locking segments can comprise radially outwardly facing actuation faces, wherein the locking segments are adapted to be pivoted inwards by means of a tool by engagement of said actuation faces. Characteristic to this embodiment is that the member (tool) that actuates the locking segments (i.e. forces the locking segments into the locking position) by contacting the actuation faces is removed when the connection has been made. This feature contributes to a slender and light connection assembly. That is, the actuating component is removed while the securing component (securing sleeve), which secures the locking segments in their locked position, remains.

The protruding shoulder of the securing sleeve and/or the retainer sleeve can have an inner diameter which is less than the outer diameter constituted by the actuation faces.

The outer diameter constituted by the outer face of the locking segments when in the locking position can be larger than 80% of the largest outer diameter of the connection assembly. It can preferably also be larger than 90%. Furthermore, the relationship between the outer diameter of the pipe locking profiles and the outer diameter of the pipes at their mid section can be less than 1.2 (12/10). It can even be less than 1.1. These features are results of the fact that the connection assembly according to the present invention is suitable for providing a slender connection assembly.

According to a second aspect of the present invention, there is provided a workover or intervention riser joint having two axial ends and an axial bore there through with an inner diameter of at least 2". According to the invention, both said axial ends are identical, weld-less, and are upset into an upset wall thickness which is at least 1.65 times larger than a riser joint wall thickness at a mid section of the riser joint.

In one embodiment of the second aspect of the present invention, the axial upset length of the axial ends is at least 8 times larger than the riser joint wall thickness at a mid section of the riser joint.

According to a third aspect of the present invention there is provided a method for upsetting a pipe end of a workover or intervention riser joint according to the second aspect of the invention. The method comprises
  a) heating the pipe end;
  b) fixing the pipe in a fixed position;
  c) punching or pressing the pipe end with an upsetting component and thereby upsetting the pipe end;
  d) repositioning the pipe to a position closer to the upsetting component;
  e) performing step b), c) and d) two times, and then;
  f) perform step b) and c).

EXAMPLE OF EMBODIMENT

Having described the invention in general terms above, a non-limiting detailed example of embodiment will now be described with reference to the drawings, in which FIG. 1 is a cross section view of a connection assembly according to the invention, where two pipe ends are not yet connected;

FIG. 2 is a cross section view corresponding to FIG. 1, however wherein the pipe ends and the connection assembly are in a connected position;

Figure 4:
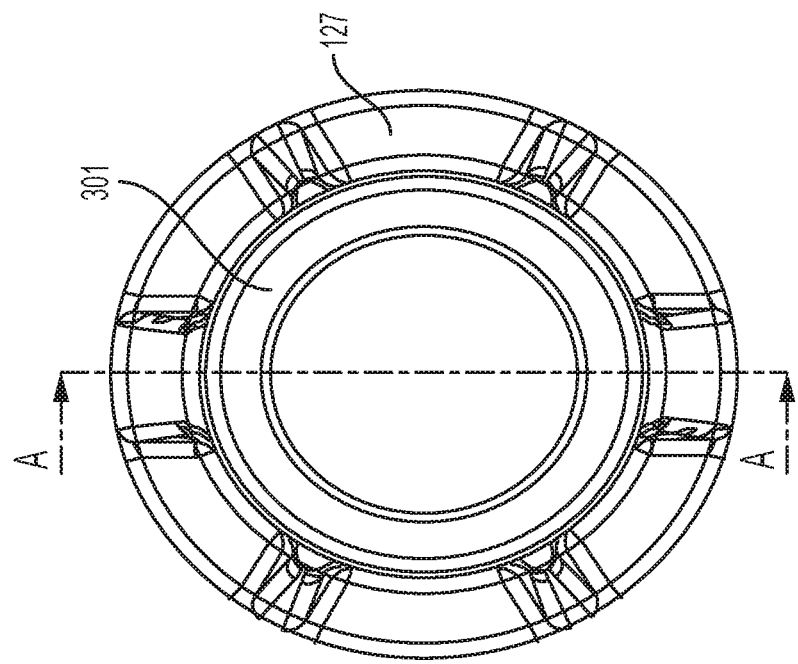
FIG. 4 shows the connection assembly from an axial direction and with the locking segments in a locking position.

FIG. 1 shows a connection assembly 1 according to the present invention in a non-connected state. The connection assembly 1 is associated with a first pipe end 201 of a first pipe 200 and a second pipe end 301 of a second pipe 300.

On each pipe 200, 300, externally facing pipe locking profiles 203, 303 extend peripherally about the circumference of the first and second pipe ends 201, 301, respectively.

On the second pipe end 301 there is attached eight locking segments 101, distributed about the circumference of the second pipe end 301. The locking segments 101 have a connected portion 103 and a movable portion 105. A part of the connected portion 103 of the locking segments 101 are retained under an axially protruding shoulder 109 of a retainer sleeve 107. The movable portion 105 is located, in the non-connected state shown in FIG. 1, in a radially outwardly pivoted position. The locking segments 101 are adapted to pivot inwards and outwards about a pivot section located underneath the protruding shoulder 109 of the retainer sleeve 107.

The retainer sleeve 107 is threaded onto externally facing pipe threads 309 of the second pipe 300 and held in place by a counter nut 111. That is, the counter nut 111 is first threaded onto the pipe threads 309, and then the retainer sleeve 107 is threaded onto the pipe threads 309. When connecting the locking segments 101 onto the second pipe end 301, the retainer sleeve 107 is rotated to move an extensive distance on the pipe threads 309. Then, while keeping the plurality of locking segments 101 in place, such as shown in FIG. 1, the retainer sleeve 107 is moved back in the opposite direction, so that the axially protruding shoulder 109 is moved over the end part of the connected portion 103 of the locking segments 101 (leftwards on FIG. 1). When the retainer sleeve 107 is in the correct position, the counter nut 111 is rotated on the pipe threads 309 towards the retainer sleeve 107 to lock the retainer sleeve 107 in position.

When the retainer sleeve 107 is in the correct retaining position, the locking segments 101 can pivot a certain angular distance in the radial direction about the pivot section located below the protruding shoulder 109, but cannot move out of engagement with the protruding shoulder 109 and the second pipe end 301.

Figure 5:
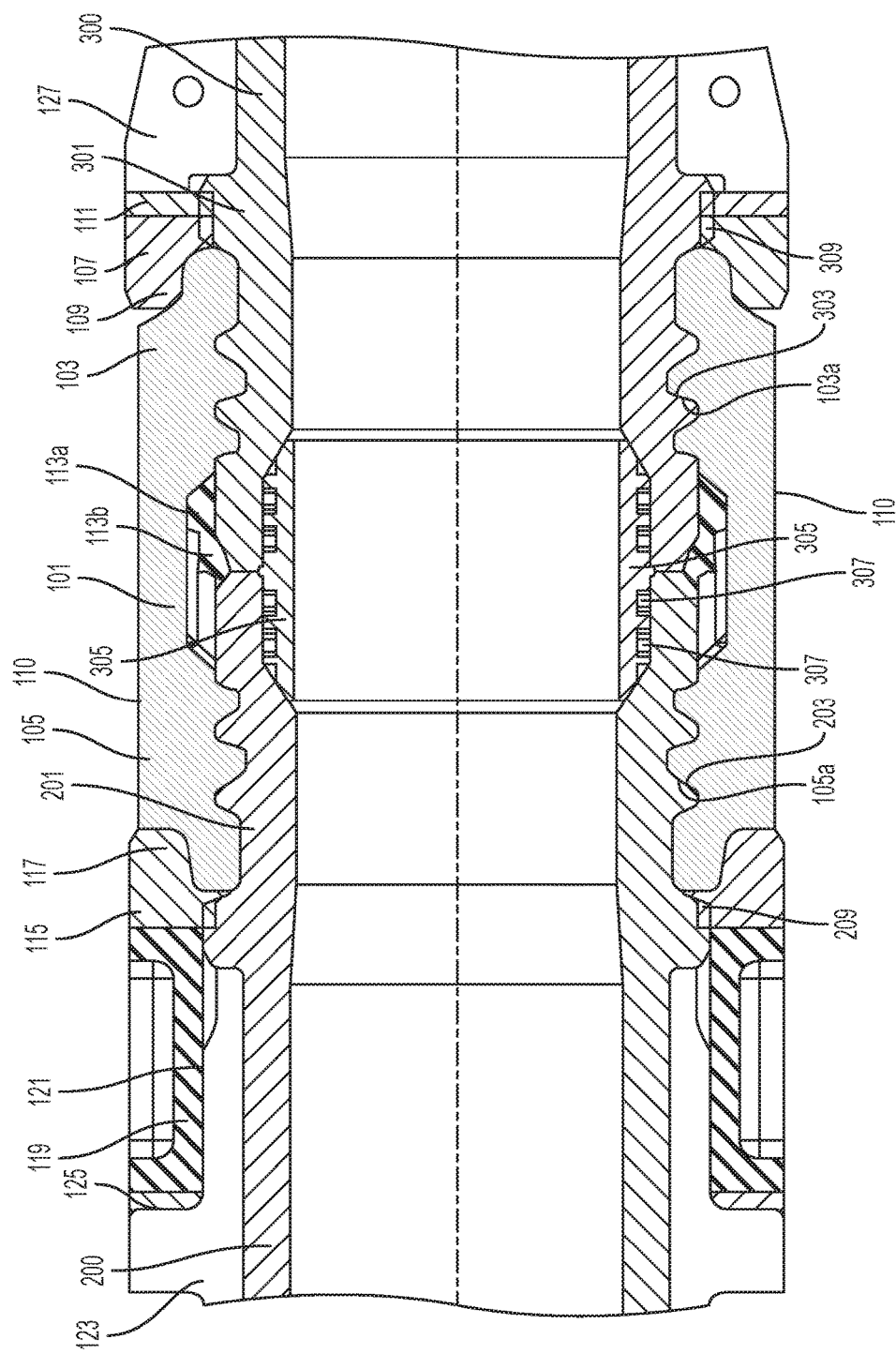
FIG. 5 is an enlarged cross section view of the connection assembly in a connected position.

The connected portion 103 and the movable portion 105 each exhibit segment locking profiles 103a and 105a, which are adapted to be arranged in a locking engagement with the pipe locking profiles 303 and 203 of the second and first pipe ends 301, 201, respectively. FIG. 2 and FIG. 5 show a locking segment 101 in the locked position, wherein the segment locking profiles 103a, 105a are in engagement with the pipe locking profiles 303, 203.

To a radially inwardly facing face of the second pipe end 301 there is arranged a sealing sleeve 305. The sealing sleeve 305 exhibits an inner diameter which substantially corresponds to the inner diameter of the first and second pipes 200, 300. Furthermore, on its radially outwardly facing surface it comprises two pairs of seals 307 which are adapted to seal against the first and second pipe end 201, 301. Thus, the sealing sleeve 305 provides a leakage proof fluid communication between the bores of the first and second pipes 200, 300.

To each locking segment 101 there is connected a spreading member 113. The spreading member 113 is a piece of rubber which is attached to the locking segment 101 by vulcanisation. It comprises a base portion 113a which is connected (vulcanised) to the locking segment 101 and an arm 113b which extends partly radially inwards and partly in an axial direction. FIG. 1 shows the locking segments 101 in a non-locked position. In this position the arm 113b abuts the second pipe end 301 and thus biases and pivots the locking segments 101 towards the outwardly pivoted position. FIG. 2 shows the locking segments 101 in the locking position. In this position the locking segments 101 have been pivoted inwardly and the arm 113b has become flexed and/or compressed, thereby making the inwardly pivoting movement possible.

In lieu of separate spreading members 113 associated to each locking segment 101, one may also arrange a spread ring that encircles the second pipe end 301, located between the locking segments 101 and the pipe end 301. A spread ring would be assembled onto the pipe end 301 before assembly of the locking segments 101. Another option would be to vulcanise elastic elements on the sides of the locking segments 101, in such an arrangement that they would exert tangentially directed force onto the locking segments. In addition to biasing the locking segments outwards, one could in this way provide a screen preventing debris from entering in between and under the locking segments 101.

When connecting the first pipe end 201 to the second pipe end 301, they are arranged coaxially as shown in FIG. 1, and moved towards each other until they abut against each other. During this movement the spreading members 113 keep the locking segments 101 in the outwardly pivoted position, such as shown in FIG. 1. When the pipe ends 201, 301 have been arranged in this way, the locking segments 101 are pivoted radially inwards into the locking position by means of a locking tool (not shown). In this position, the segment locking profiles 103a, 105a of the locking segments 101 are in engagement with the pipe locking profiles 203, 303.

The (not shown) locking tool can engage the locking segments 101 at radially facing actuation faces 110. In this embodiment, the actuation faces 110 extend between the upper right and upper left corner of the upper locking segment 101 shown in the cross sections of FIG. 2 and FIG. 5.

As shown in FIG. 2 an end part of the movable portion 105 of the locking segments 101 is secured in the inwardly pivoted locking position by an axially protruding securing shoulder 117 of a securing sleeve 115. The securing sleeve 115 is threaded onto pipe threads 209 on the first pipe end 201. In order to move the locking segments 101 into this position they need to move past the securing sleeve 115. In order to make this possible, the securing sleeve 115 is moved past the pipe threads 209 as shown in FIG. 1. When the locking segments 101 have been pivoted inwards, past the protruding securing shoulder 117, the securing sleeve 115 is moved back again, to the position shown in FIG. 2. In this position the protruding shoulder 117 extends in an axial direction over a part of the movable portion 105 of the locking segments 101, thereby securing them in the locking position.

Axially adjacent the securing sleeve 115 there is arranged an elastic collar 119 (to the left of the securing sleeve 115 in FIG. 1). The elastic collar 119 is arranged to bias the securing sleeve 115 towards the locking segments 101, in order to prevent unintended release of the locking segments 101 from their locking position. In FIG. 1, the elastic collar 119 is compressed into a smaller axial extension than in FIG. 2. The elastic collar 119 can be made of rubber.

Instead of the counter nut 111, one may also arrange an elastic collar to bias the retainer sleeve 107 in the axial direction, corresponding to the elastic collar 119 arranged adjacent the securing sleeve 115.

The elastic collar 119 is arranged on a supporting surface 121 arranged radially within the elastic collar 119. The supporting surface 121 extend circumferentially about the first pipe 200 and is part of a first support structure 123 attached to the first pipe 200. The support structure 123 is made of two parts and is bolted onto the first pipe 200 (cf. the exploded view of FIG. 8). It comprises a shoulder 125 against which the elastic collar 119 abuts when it is compressed in the axial direction.

Instead of the elastic collar 119 on the supporting surface 121 of the support structure 123, one could also arrange a counter nut in order to secure the securing sleeve 115 in its correct position on the pipe threads 209 of the first pipe end 201. Also, instead of threading the retainer sleeve 107 and the securing sleeve 115 on the pipe threads 309, 209, respectively, they could also be arranged sliding in an axial direction on a sliding surface and being biased towards the locking segment by an elastic member, such as the elastic collar 119.

Corresponding to the first support structure 123 attached about the first pipe 200, a second support structure 127 is attached to the second pipe 300. The object of the second support structure 127 is to retain the counter nut 111 in the securing position, as well as to reduce snaking.

It should be noted that, according to the described example embodiment, the first and second pipe ends 201, 301 can advantageously be identical. That is, the pipe threads 209 of the first pipe end 201 correspond to the pipe threads 309 of the second pipe end 301. Also, the pipe locking profiles 203, 303 of the first and second pipe ends 201, 301 are identical. A result of this feature is that one does not need to consider which end of the pipe which is used as a first pipe end 201 and a second pipe end 301 when assembling the connection assembly 1 onto the pipe ends.

It should also be noted that, with disregard to the spreading members 113, the locking segments 101 could be symmetric. That is, the connected portion 103 of the locking segments 101 could be identical to the movable portion 105. Furthermore, in this embodiment the retainer sleeve 107 is identical to the securing sleeve 115. These features significantly facilitate the assembly of the connection assembly 1, and reduce the risk of erroneous assembly.

Figure 3:
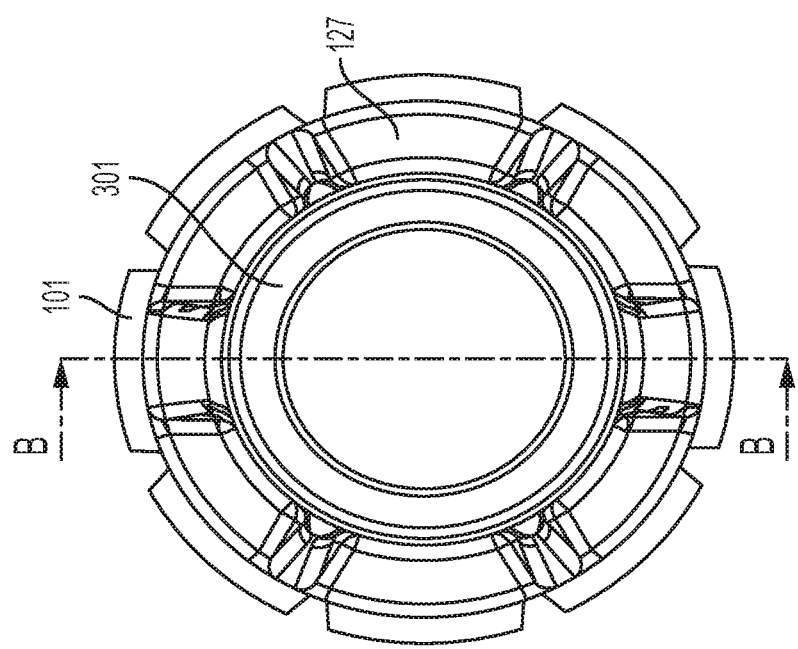
FIG. 3 shows the connection assembly from an axial direction and with the locking segments in a free position.

FIG. 3 and FIG. 4 show views in the axial direction of the second pipe end 301 with the locking segments 101 in an outwardly and inwardly pivoted position, respectively.

FIG. 5 is an enlarged view of the cross section view shown in FIG. 2, wherein the connection assembly 1 is shown in the connected position with the locking segments 101 in the inwardly pivoted locking position.

Figure 6:
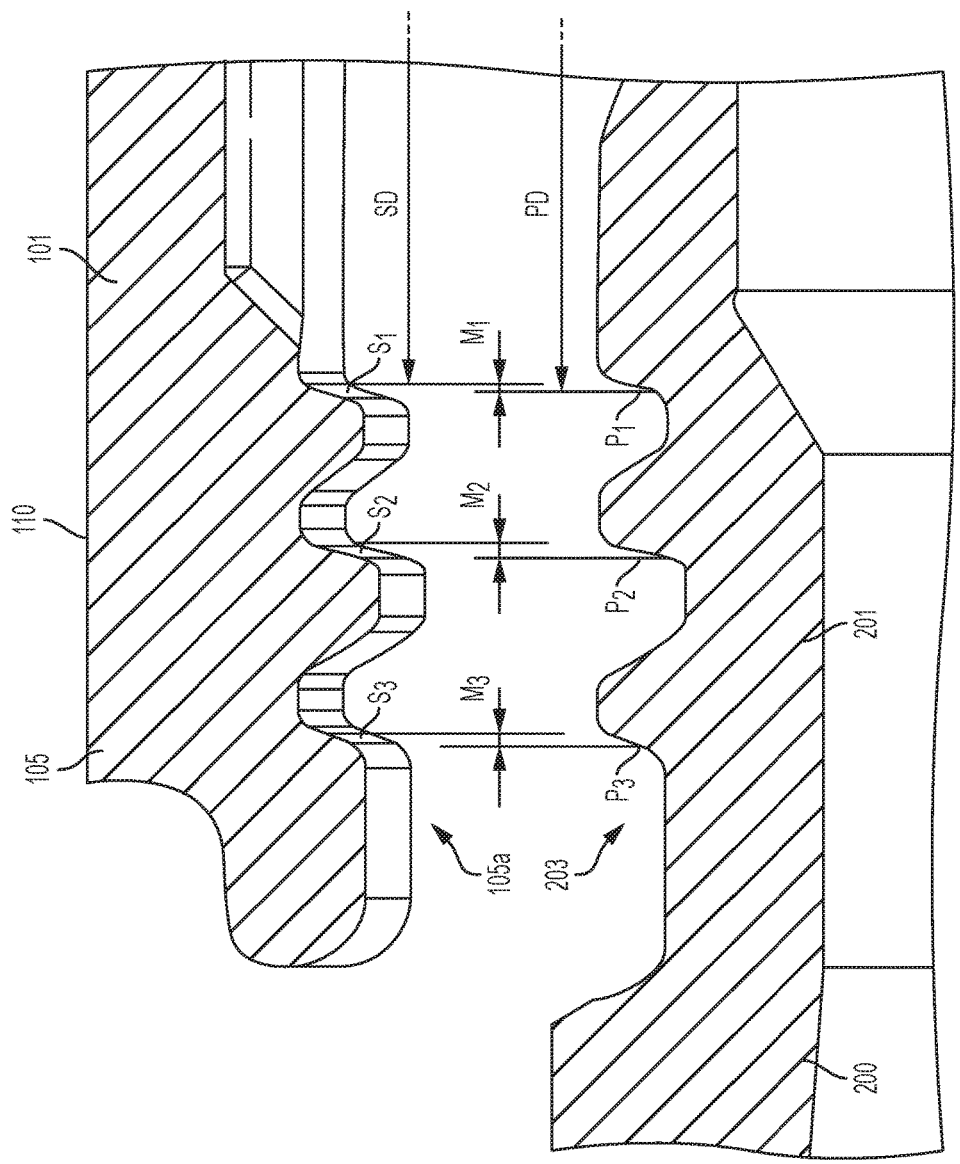
FIG. 6 is a cross section side view of one detached locking segment.

FIG. 6 is an enlarged cross section view of a part of a pipe end 201 and a part of a locking segment 101. In particular, the pipe locking profiles 203 and the segment locking profiles 105a are shown. It will be understood that, for this embodiment, even though the pipe locking profiles 203 of the first pipe end 201 and the segment locking profiles 105a of the movable portion 105 of the locking segments 101 are described here, the described features are also present for the second pipe end 301 and the connected portion 103 of the locking segments 101.

When the first pipe end 201 is coaxially arranged with and abutting the facing second pipe end 301, a pipe profile distance PD exists between the pipe locking profile 203 of the first pipe end 201 and the pipe locking profile 303 of the second pipe end 301. Correspondingly, a segment profile distance SD exists between the segment locking profile 103a of the connected portion 103 and the segment locking profile 105a of the movable portion 105 of the locking segment 101. In FIG. 6, the pipe profile distance PD and the segment profile distance SD are indicated. Only one end of said distances is shown. The opposite ends may correspond to the shown end. However, the respective locking profiles of the opposite ends may have another configuration.

The pipe profile distance PD and the segment profile distance SD are almost identical. There is however a small misalignment. The segment profile distance SD is somewhat shorter than the pipe profile distance PD. Due to the inclined faces (which will be described below) of the facing profiles, this misalignment results in a pretension of the locking segments 101 when in the locking position.

In the embodiment described with reference to FIG. 6, the segment locking profile 105a of the movable portion 105 of the locking segment 101 exhibits three inclined faces, namely a first, second, and third inclined face $S_1$, $S_2$, $S_3$. The facing pipe locking profile 203 of the first pipe end 201 correspondingly exhibits a first, second, and third inclined face $P_1$, $P_2$, $P_3$, which are adapted to engage with the facing inclined faces $S_1$, $S_2$, $S_3$ of the segment locking profile 105a. As described above, there is a misalignment between the segment profile distance SD and the pipe profile distance PD. At the point of the first inclined faces $P_1$, $S_1$ of the pipe locking profile 203 and the segment locking profile 105a, respectively, there is a first misalignment distance $M_1$.

Furthermore, there is a corresponding second misalignment distance $M_2$ at the point of the second inclined faces $P_2$, $S_2$, of the pipe locking profile 203 and the segment locking profile 105a, respectively. This second misalignment distance $M_2$ is, according to an embodiment of the present invention, larger than the first misalignment distance $M_1$. That is, the misalignment distances at various points of the locking profiles vary. Having $M_2$ larger than $M_1$ results in a more even force distribution within the locking segment 101, particularly in the area of the segment locking profile 105a.

Correspondingly, there is a third misalignment distance $M_3$ at the position of the third inclined faces $P_3$, $S_3$. For the design of locking segments 101 and pipe ends 201, 301 shown in the appended drawings, it has been found that the third misalignment distance $M_3$ should preferably be shorter than the second misalignment distance $M_2$, however larger than the first $M_1$. This is mainly in order to increase the fatigue life of the pipes 200, 300.

The misalignment distance can be defined as the misalignment between the respective facing inclined faces of the locking profiles, with respect to a position in which they would engage or fit perfectly. In a perfect fit, they would engage without causing forces in the locking profiles resulting from the inclined faces sliding against each other.

It should be mentioned that the misalignment distances shown in FIG. 6 are greatly exaggerated for illustrational purposes. The positioning of the lines indicating the distances are not precisely placed, but rather arranged so as to show the variations of the different misalignment distances.

Figure 7:
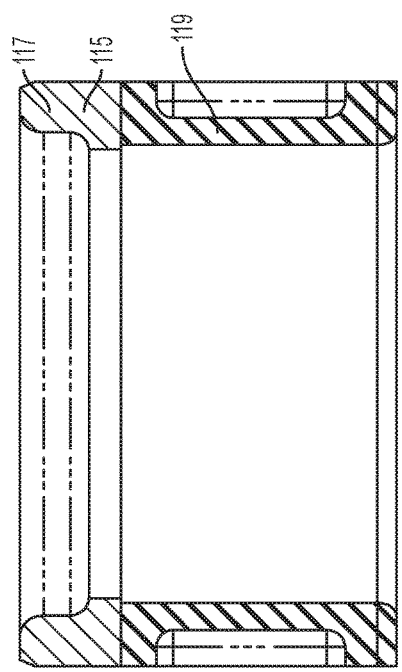
FIG. 7 is a cross section view of an elastic collar and a securing sleeve.

FIG. 7 shows a cross section view of the elastic collar 119 and the securing sleeve 115 abutting against it.

Figure 8:
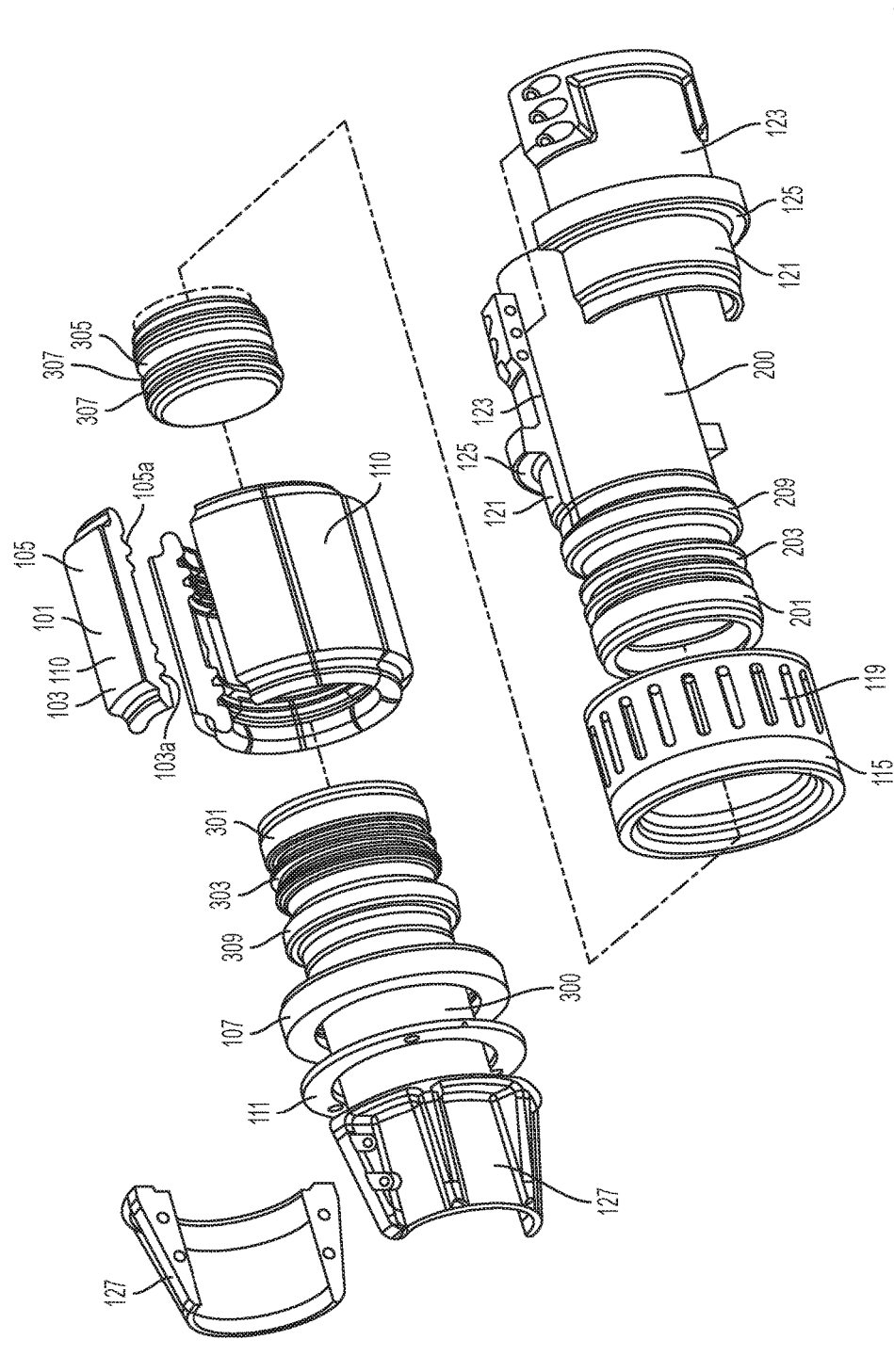
FIG. 8 is an exploded perspective view of the connection assembly, without the pipe ends.

FIG. 8 is an exploded view of the connection assembly 1 according to the invention and the above described embodiment. Contrary to FIG. 1, FIG. 2 and FIG. 5, the first pipe end 201 is on the right hand side and the second pipe end 301 is on the left hand side.

Figure 9:
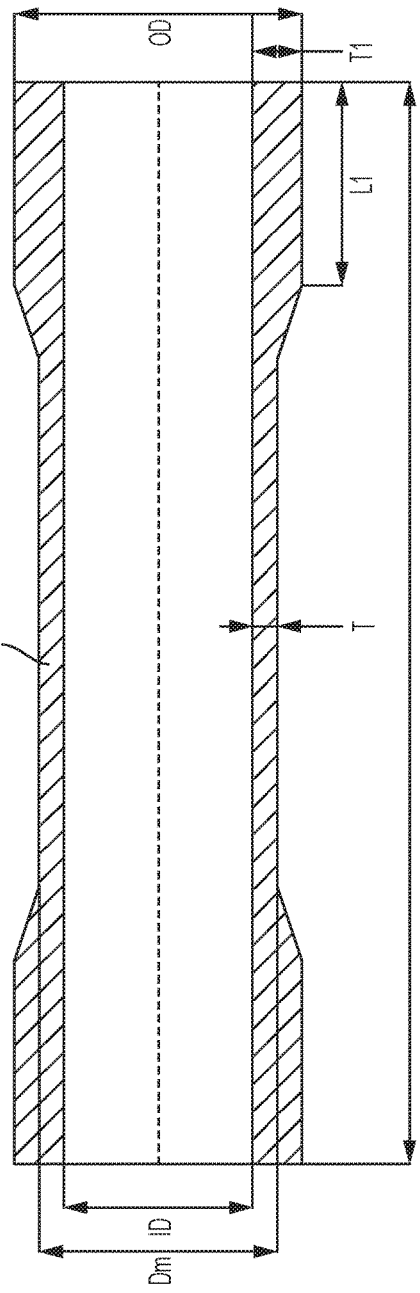
FIG. 9 shows a principle cross section view of an upset riser joint before machining of locking profiles at the pipe ends.

FIG. 9 shows a pipe 200 at the stage before the pipe locking profiles 203 have been made at the respective pipe ends 201. Each pipe end 201 is upset in such way that the pipe wall thickness T1 at the pipe end is at least 1.65 times larger than before the upset process. Thus, the upset wall thickness T1 is 1.65 times larger than the wall thickness T at a mid section of the pipe 200.

Furthermore, the upsetting length of the pipe end 201 is at least 8 times larger than the wall thickness T at the mid section.

When upsetting the pipe end 201, the pipe 200 is held in place during punching of the pipe end with an upsetting component or punching machine (not shown). Due to the large size of the pipe, which in this embodiment has an inner diameter of at least 2" or at least 5", the pipe 200 may move some distance due to the forces of the punch. In order to prepare the pipe for the next punch, it is repositioned towards the upsetting component or upsetting machine. In order to achieve the shown upset volume, the pipe end 201 is punched 3 or even 4 times with the punching component. When punching the pipe end is heated in order to make the upsetting feasible.

In stead of punching the heated pipe end with the upsetting component, the upsetting component could also be adapted to press the pipe end, for instance by hydraulic pressing means.

It should be noted that the pipe 200 shown in FIG. 9 is only a principle sketch. A riser pipe joint would typically be longer, compared to its thickness.

It should be noted that in the above description, terms such as first pipe end and second pipe end are only used to describe the embodiments shown in the drawings. As will be understood by the person skilled in the art, the first and second pipes may switch places. Furthermore, a variety of combinations of the above described features and alternative embodiments are possible within the scope of the invention, as defined in the claims.

The invention claimed is:

1. A connection assembly adapted to connect a first pipe end and a second pipe end of respective first and second pipes in a position where the first and second pipe ends are coaxially arranged and abutting each other, wherein the first and second pipe ends exhibit radially outwardly facing pipe locking profiles, and wherein the connection assembly comprises:
    a plurality of locking segments adapted to be distributed about a perimeter of the second pipe end and which locking segments have a connected portion and a movable portion, the connected portion and the movable portion each have segment locking profiles adapted to face the pipe locking profiles, and wherein the movable portion is radially pivotable, between an inwardly pivoted locking position and an outwardly pivoted free position, about a pivot section;
    a retainer sleeve adapted to extend about a circumference of the second pipe and having an axially protruding retainer shoulder under which retainer shoulder a part of the connected portion of the plurality of locking segments is arranged and under which retainer shoulder the pivot section is located;
    a securing sleeve adapted to extend about a circumference of the first pipe and having an axially protruding securing shoulder;
    a first pair of locking profiles adapted to include the segment locking profile of the connected portion and the facing pipe locking profile of the second pipe end, and
    a second pair of locking profiles adapted to include the segment locking profile of the movable portion and the facing pipe locking profile of the first pipe end;
    wherein the locking segments comprise radially outwardly facing actuation faces and are adapted to be pivoted inwards by means of a tool by engagement of said actuation faces;
    wherein the locking segments are configured to remain in the locked position when the tool is removed, as a part of the movable portion of the plurality of locking segments is arranged under the securing shoulder of the securing sleeve when in the locking position; and
    wherein the assembly further comprises a spreading member comprising a portion of elastic material arranged between the locking segments and the second pipe end, or between adjacent locking segments, thereby forcing the locking segments towards the outwardly pivoted free position.

2. The connection assembly according to claim 1, wherein the segment locking profiles of the connected portion and the movable portion, as well as the pipe locking profiles of the first and second pipe ends all exhibit inclined locking faces.

3. The connection assembly according to claim 1, wherein the securing sleeve is axially retractable on the first pipe, wherein an elastic collar is arranged axially between the securing sleeve and a support structure, wherein the elastic collar biases the securing sleeve towards the locking segments.

4. The connection assembly according to claim 1, wherein the protruding shoulder of the securing sleeve has an inner diameter which is less than the outer diameter constituted by the actuation faces, and that the protruding shoulder is adapted to abut another portion of the locking segments than their actuation faces.

5. The connection assembly according to claim 1, wherein at least one pair exhibits an inclined face which is misaligned a misalignment distance with respect to the facing inclined face of the profile with which it engages, which brings about tensile stress in the axial direction in the locking segments when they are in the locking position.

6. The connection assembly according to claim 1, further comprising a sealing sleeve extending from a radially inwardly facing face of the second pipe end to a radially inwardly facing face of the first pipe end.

7. The connection assembly according to claim 6, wherein the sealing sleeve has an inner diameter that substantially corresponds to the inner diameter of the first and second pipes.

8. The connection assembly according to claim 1, wherein the securing sleeve is threaded onto pipe threads on the first pipe end.

9. The connection assembly according to claim 1, wherein a separate spreading member is attached to each locking segment.

10. The connection assembly according to claim 1, wherein the first and second pipes are riser pipes.

11. The connection assembly according to claim 1, wherein the first and second pipe ends are upset riser joint ends.

12. A connection assembly adapted to connect a first pipe end and a second pipe end of respective first and second pipes in a position where the first and second pipe ends are coaxially arranged and abutting each other, wherein the first and second pipe ends exhibit radially outwardly facing pipe locking profiles, and wherein the connection assembly comprises:
    a plurality of locking segments adapted to be distributed about a perimeter of the second pipe end and which locking segments have a connected portion and a movable portion, the connected portion and the movable portion each have segment locking profiles adapted to face the pipe locking profiles, and wherein the movable portion is radially pivotable, between an inwardly pivoted locking position and an outwardly pivoted free position, about a pivot section;
    a retainer sleeve adapted to extend about a circumference of the second pipe and having an axially protruding retainer shoulder under which retainer shoulder a part of the connected portion of the plurality of locking segments is arranged and under which retainer shoulder the pivot section is located;

a securing sleeve adapted to extend about a circumference of the first pipe and having an axially protruding securing shoulder;
a first pair of locking profiles adapted to include the segment locking profile of the connected portion and the facing pipe locking profile of the second pipe end, and
a second pair of locking profiles adapted to include the segment locking profile of the movable portion and the facing pipe locking profile of the first pipe end;
wherein the locking segments comprise radially outwardly facing actuation faces and are adapted to be pivoted inwards by means of a tool by engagement of said actuation faces;
wherein the locking segments are configured to remain in the locked position when the tool is removed, as a part of the movable portion of the plurality of locking segments is arranged under the securing shoulder of the securing sleeve when in the locking position; and
wherein among the first and second pairs of locking profiles, at least one pair exhibits first and second inclined faces of each facing locking profile, wherein the first inclined faces are closer to the opposite pair than the second inclined faces, and wherein a first misalignment distance between the first inclined faces is smaller than a second misalignment distance between the second inclined faces.

13. A connection assembly adapted to connect a first pipe end and a second pipe end of respective first and second pipes in a position where the first and second pipe ends are coaxially arranged and abutting each other, wherein the first and second pipe ends exhibit radially outwardly facing pipe locking profiles, and wherein the connection assembly comprises:
a plurality of locking segments adapted to be distributed about a perimeter of the second pipe end and which locking segments have a connected portion and a movable portion, the connected portion and the movable portion each have segment locking profiles adapted to face the pipe locking profiles, and wherein the movable portion is radially pivotable, between an inwardly pivoted locking position and an outwardly pivoted free position, about a pivot section;
a retainer sleeve adapted to extend about a circumference of the second pipe and having an axially protruding retainer shoulder under which retainer shoulder a part of the connected portion of the plurality of locking segments is arranged and under which retainer shoulder the pivot section is located;
a securing sleeve adapted to extend about a circumference of the first pipe and having an axially protruding securing shoulder;
a first pair of locking profiles adapted to include the segment locking profile of the connected portion and the facing pipe locking profile of the second pipe end, and
a second pair of locking profiles adapted to include the segment locking profile of the movable portion and the facing pipe locking profile of the first pipe end;
wherein the locking segments comprise radially outwardly facing actuation faces and are adapted to be pivoted inwards by means of a tool by engagement of said actuation faces;
wherein the locking segments are configured to remain in the locked position when the tool is removed, as a part of the movable portion of the plurality of locking segments is arranged under the securing shoulder of the securing sleeve when in the locking position; and
wherein the first and second pipe ends are identical.

14. A connection assembly adapted to connect a first pipe end and a second pipe end of respective first and second pipes in a position where the first and second pipe ends are coaxially arranged and abutting each other, wherein the first and second pipe ends exhibit radially outwardly facing pipe locking profiles, and wherein the connection assembly comprises:
a plurality of locking segments adapted to be distributed about a perimeter of the second pipe end and which locking segments have a connected portion and a movable portion, the connected portion and the movable portion each have segment locking profiles adapted to face the pipe locking profiles, and wherein the movable portion is radially pivotable, between an inwardly pivoted locking position and an outwardly pivoted free position, about a pivot section;
a retainer sleeve adapted to extend about a circumference of the second pipe and having an axially protruding retainer shoulder under which retainer shoulder a part of the connected portion of the plurality of locking segments is arranged and under which retainer shoulder the pivot section is located;
a securing sleeve adapted to extend about a circumference of the first pipe and having an axially protruding securing shoulder;
a first pair of locking profiles adapted to include the segment locking profile of the connected portion and the facing pipe locking profile of the second pipe end, and
a second pair of locking profiles adapted to include the segment locking profile of the movable portion and the facing pipe locking profile of the first pipe end;
wherein the locking segments comprise radially outwardly facing actuation faces and are adapted to be pivoted inwards by means of a tool by engagement of said actuation faces;
wherein the locking segments are configured to remain in the locked position when the tool is removed, as a part of the movable portion of the plurality of locking segments is arranged under the securing shoulder of the securing sleeve when in the locking position; and
wherein the locking segments are symmetrical, as the connected portion is identical to the movable portion.

15. The connection assembly according to claim 14, wherein the retainer sleeve is identical to the securing sleeve.

16. A connection assembly adapted to connect a first pipe end and a second pipe end of respective first and second pipes in a position where the first and second pipe ends are coaxially arranged and abutting each other, wherein the first and second pipe ends exhibit radially outwardly facing pipe locking profiles, and wherein the connection assembly comprises:
a plurality of locking segments adapted to be distributed about a perimeter of the second pipe end and which locking segments have a connected portion and a movable portion, the connected portion and the movable portion each have segment locking profiles adapted to face the pipe locking profiles, and wherein the movable portion is radially pivotable, between an inwardly pivoted locking position and an outwardly pivoted free position, about a pivot section;
a retainer sleeve adapted to extend about a circumference of the second pipe and having an axially protruding retainer shoulder under which retainer shoulder a part of the connected portion of the plurality of locking segments is arranged and under which retainer shoulder the pivot section is located;

a securing sleeve adapted to extend about a circumference of the first pipe and having an axially protruding securing shoulder;

a first pair of locking profiles adapted to include the segment locking profile of the connected portion and the facing pipe locking profile of the second pipe end, and a second pair of locking profiles adapted to include the segment locking profile of the movable portion and the facing pipe locking profile of the first pipe end;

wherein the locking segments comprise radially outwardly facing actuation faces and are adapted to be pivoted inwards by means of a tool by engagement of said actuation faces;

wherein the locking segments are configured to remain in the locked position when the tool is removed, as a part of the movable portion of the plurality of locking segments is arranged under the securing shoulder of the securing sleeve when in the locking position; and wherein at the axial position where the two pipe ends abut when in the locked position, the outer face of the locking segments constitute the outermost radial face of the connection assembly.

17. A connection assembly adapted to connect a first pipe end and a second pipe end of respective first and second pipes in a position where the first and second pipe ends are coaxially arranged and abutting each other, wherein the first and second pipe ends exhibit radially outwardly facing pipe locking profiles, and wherein the connection assembly comprises:

a plurality of locking segments adapted to be distributed about a perimeter of the second pipe end and which locking segments have a connected portion and a movable portion, the connected portion and the movable portion each have segment locking profiles adapted to face the pipe locking profiles, and wherein the movable portion is radially pivotable, between an inwardly pivoted locking position and an outwardly pivoted free position, about a pivot section;

a retainer sleeve adapted to extend about a circumference of the second pipe and having an axially protruding retainer shoulder under which retainer shoulder a part of the connected portion of the plurality of locking segments is arranged and under which retainer shoulder the pivot section is located;

a securing sleeve adapted to extend about a circumference of the first pipe and having an axially protruding securing shoulder;

a first pair of locking profiles adapted to include the segment locking profile of the connected portion and the facing pipe locking profile of the second pipe end, and a second pair of locking profiles adapted to include the segment locking profile of the movable portion and the facing pipe locking profile of the first pipe end;

wherein the locking segments comprise radially outwardly facing actuation faces and are adapted to be pivoted inwards by means of a tool by engagement of said actuation faces;

wherein the locking segments are configured to remain in the locked position when the tool is removed, as a part of the movable portion of the plurality of locking segments is arranged under the securing shoulder of the securing sleeve when in the locking position; and wherein the locking segments do not bend when pivoting between the free position and the locking position.

* * * * *